(12) United States Patent
McCarney

(10) Patent No.: US 6,443,054 B1
(45) Date of Patent: Sep. 3, 2002

(54) HANDS FREE TORTILLA FORMING MACHINE

(76) Inventor: Kevin T. McCarney, 338 S. California St., Burbank, CA (US) 91505

( * ) Notice: Subject to any disclaimer, the term of this patent is extended or adjusted under 35 U.S.C. 154(b) by 0 days.

(21) Appl. No.: 10/055,740

(22) Filed: Jan. 25, 2002

(51) Int. Cl.[7] .......................... A23L 1/00; A21C 11/00; A21B 1/42; B29C 43/02; B29C 43/04

(52) U.S. Cl. ...................... 99/349; 99/353; 99/372; 99/432; 425/150; 425/167; 425/383; 425/394; 425/408; 425/412

(58) Field of Search .................... 99/349, 339, 340, 99/352–355, 372–380, 381, 384, 422, 432, 428, 427, 450.1, 450.2, 483, 426; 426/496, 502, 512; 425/150, 152, 167, 195, 346, 412, 394, 383–385, 398, 363, 366, 402, 408; 219/524, 525

(56) References Cited

U.S. PATENT DOCUMENTS

| | | | |
|---|---|---|---|
| 1,880,858 A | 10/1932 | Davis | |
| 2,975,741 A | 3/1961 | Ruffino | |
| 3,068,778 A | * 12/1962 | Majerus | .................. 99/375 |
| 3,716,319 A | 2/1973 | Norman | |
| 3,814,005 A | 6/1974 | Widdel | |
| 3,949,660 A | 4/1976 | Kuhlman | |
| D255,412 S | 6/1980 | Bereza | |
| 4,303,677 A | 12/1981 | De Acetis | |
| 4,508,025 A | * 4/1985 | Schultz | .................. 99/353 |
| 4,559,002 A | 12/1985 | Atwood | |
| 4,634,365 A | * 1/1987 | Triporo et al. | .......... 425/394 X |
| 4,690,043 A | 9/1987 | Pacilio | |
| 4,857,349 A | 8/1989 | Finlay | |
| 4,874,156 A | 10/1989 | Goldzweig | |
| D307,371 S | 4/1990 | D'Orlando | |
| 4,973,240 A | 11/1990 | Reilly | |
| 5,074,778 A | 12/1991 | Betts, Jr. et al. | |
| 5,149,594 A | 9/1992 | Lewandowski et al. | |
| 5,154,115 A | 10/1992 | Kian | |
| 5,226,352 A | 7/1993 | Savage | |
| 5,417,149 A | 5/1995 | Raio et al. | |
| 5,469,779 A | * 11/1995 | Amore et al. | .................. 99/349 |
| D369,941 S | 5/1996 | Ramina | |
| D377,138 S | 1/1997 | Angelo | |
| 5,800,844 A | 9/1998 | Raio et al. | |
| 5,996,476 A | 12/1999 | Schultz | |
| 6,205,914 B1 | 3/2001 | Mc Carney | |
| 6,224,167 B1 | 6/2001 | Mc Carney | |

* cited by examiner

Primary Examiner—Timothy F. Simone
(74) Attorney, Agent, or Firm—Vickers, Daniels & Young (57) ABSTRACT

A hands free tortilla forming machine for molding dough balls into a tortilla shell. The forming machine includes a forming portion, a linkage mechanism, a vertically extending hinge block, and a foot pedal which can be mounted to a moveable cart. The forming portion includes a base having an upwardly facing forming surface and a base having an downwardly facing forming surface. The vertically extending hinge block beings mounted relative to the base and having a first end facing the base and a second end opposite to the first end. The rear end of the push member includes a lever arm which protrudes from its rear end and which is pivotally interengaged with the hinge block at a hinge point. This provides for relative rotation of the push member relative to the base about a member axis between an access position and a formed position. The lever further includes a second pivot spaced from the first pivot which interengages with the linkage mechanism. The foot pedal is pivotal about a pedal axis between a released position and an engaged position and is connected to the linkage mechanism such that as the pedal is pivoted towards the engaged position, the linkage mechanism urges the push member toward the formed position. A spring is utilized to return the pedal and the push member to the released position and access position respectively.

20 Claims, 5 Drawing Sheets

HANDS FREE TORTILLA FORMING MACHINE

FIELD OF THE INVENTION

The present invention relates to the art of making tortilla shells and, more particularly, to a hands free tortilla forming machine for producing a quantity of tortilla shells from balls of dough.

INCORPORATION BY REFERENCE

It is been known in the art to utilize pivotally connected forming plates in connection with a sizing ring to form a dough ball into a tortilla shell which is shown in McCarney U.S. Pat. No. 6,244,167 and McCarney U.S. Pat. No. 6,205,914 which are incorporated by reference for background information. While these references show effective tortilla forming machines capable of forming a wide range of sizes and shapes of tortilla shells, these tortilla forming machines are hand operated thereby requiring hand force to fully form the tortilla shell.

BACKGROUND OF THE INVENTION

It is, of course, well known that a ball of dough can be molded into various shapes and sizes to produce a tortilla shell. However, the traditional forming machines had several disadvantages. In this respect, prior art forming machines generally fall into one of two different categories. The first category relates to forming machines which are based on simple mechanical structures that require hand force to operate the machine. While these machines are simple to use, are typically inexpensive and easy to maintain, they are not well suited for quickly producing tortilla shells based on their manual operation. Accordingly, the machines in this category are not well suited for making a lot of shells which is necessary for use in connection with larger restaurants or retail products. The second category is designed for quickly producing tortilla shells. As a result, these machines are used to produce higher volumes of tortilla shells. However, the forming machines of this category rely on complicated, expensive and often large mechanical structures to achieve the desired result. Furthermore, these mechanical structures require a power source to drive the mechanical action. Therefore, these machines are only suited for higher volume production of tortilla shells. As a result, there is a significant gap between the lower volume, traditionally household style machines and those which are used for high volume tortilla shell production.

The gap between these categories prevents medium scale operations from obtaining an effective forming machine for its needs. Furthermore, the machines in both categories described above are not well suited for smaller retail operations or even operations which are mobile in nature, such as food stands or taco stands. Obviously the cost of the high volume machines prevent them from being used in many of the gap operations. However, the complexity of the mechanical structure of these machines also prevents them from being used by the gap operations. Many smaller, full service operations offer a broad menu which includes differently sized tortilla shells and, therefore, changeover from one size tortilla forming shell to another is also important. Complicated mechanical structures, as are found in the high volume machines, are not well suited for quick changes from one size shell to another size shell. While this is not an issue when the forming machine is used to produce hundreds or even thousands of a particular tortilla shell, it can be a major problem for the full service restaurant that offers a wide range of dough products.

Another factor which makes the high volume machines incompatible for many operations is that fact that these machines require electrical, pneumatic or hydraulic components which are bulky, and not easily moved. Accordingly, the machines can not be used at many food stands due to the lack of power and/or the limited space which is available. As will be appreciated from the above, there is a significant void between the home style machines and the high volume production machines. The void relates to forming machine that can be used to easily produce a variety of differently sized tortilla shells quickly without necessitating complicated mechanical and/or electrical systems. Therefore the machine can be inexpensively produced, easily moved between different locations and easily stored.

SUMMARY OF THE INVENTION

In accordance with the present invention, a hands free tortilla forming machine is provided which advantageously allows dough products to be quickly produced while still having a uniform thickness and peripheral shape. Further, the tortilla forming machine according to the present invention allows quick and easy changes in the thickness and peripheral shape of the formed tortilla shell without requiring extensive or time consuming modifications to the forming machine. And even further, the forming machine includes an actuating mechanism which allows the operator to safely use both hands while the tortilla shell is being formed.

In this respect, a tortilla forming machine is provided which produces the foregoing advantages by utilizing a foot operated mechanical link structure which provides enough mechanical advantage so that the operator is not required to use significant force to actuate the foot pedal. In addition, the individual links of the mechanical link structure are compact and can be easily mounted on a portable cart. Furthermore, the mechanical link structure produces quick pivotal movement of the push plate during the initial portion of its stroke while it produces high levels of force during the later or forming portion of the stroke.

It is accordingly an outstanding objective of the present invention to provide an improved hands free tortilla forming machine for molding tortilla shells of a desired thickness and peripheral shape.

A further object of the present invention is to provide a tortilla forming machine which can be quickly and easily changed from forming tortilla shells of one size to tortilla shells of another size.

Yet another object of the present invention is to provide a tortilla forming machine that can be used to quickly produce finished tortilla shells without complicated mechanical and/or electrical structures.

Yet still another object of the present invention is to provide a tortilla forming machine that can quickly produce a number of differently sized tortilla shells.

Still yet another object of the present invention is to provide a tortilla forming machine that can quickly produce tortilla shells and is portable.

Even yet another object of the present invention is to provide a tortilla forming machine with quick actuation that does not compromise the force generating capability of the machine during the final forming portion of the stroke.

Yet a further object of the present invention is the provision of a tortilla forming machine of the foregoing character which is economical to manufacture, easy to manipulate with respect to forming the dough ball, and which is effective in repeatedly producing a tortilla shell at a desired thickness and peripheral shaped.

BRIEF DESCRIPTION OF THE DRAWINGS

The foregoing objects and others will in part be obvious and in part be pointed out more fully hereinafter in conjunction with the written description of a preferred embodiment of the invention illustrated in the accompanying drawings in which.

DESCRIPTION OF A PREFERRED EMBODIMENT

Referring now to the drawings wherein the showings are for the purpose of illustrating a preferred embodiment of the invention only and not for the purpose of limiting the same.

FIGS. 1–5 show a hands free tortilla forming machine 10 having a forming portion 12 which is made essentially of a base 14, an upper push member 16 that moves relative to base 14 and at least one sizing ring 18. Base 14 is rigidly secured to a table top 20 of a cart 22 with fasteners 24. It is preferable that cart 22 can be freely moved or transported and therefore it is shown with locking casters 26. It should be noted that various other base structures could be used to support forming machine 10. Base 14 includes an upwardly facing forming surface 28 which supports sizing ring 18. Forming surface 28 can include a recess section 30 for supporting and centering sizing ring 18. While base 14 can be made from various material such as, but not limited to, metal, plastic or wood, it is preferred that forming surface 28 is made from materials designed for use with food products. This can include stainless steels or hardwoods. Furthermore, in order to facilitate the removal of the tortilla shell after the forming process, non-stick surfaces such as TEFLON®, produced by E. I. Dupont can be utilized. Push member 16 includes a downwardly facing forming surface 32 and moves relative to base 14 between an access position shown in FIG. 2 and a formed position shown in FIG. 3. Push member 16 and surface 32 are made from similar materials as base 14 and surface 28 respectively. Push member 16 further includes an "L" shaped lever arm 34 which extends rearwardly and upwardly beyond a back end 36 of push member 16. Lever 34 connects forming portion 12 to the movement mechanisms which will be discussed below.

Sizing ring 18 controls the forming of a dough ball 40 into tortilla shell 42. In this respect, the height of sizing ring 18 controls the resulting thickness of completed tortilla shell 42 and an inner surface 44 controls the peripheral shape of the resulting tortilla shell 42. The movement of push member 16 relative to base 14, which will hereinafter be referred to as the stroke of the forming machine, forces dough ball 40 downwardly and outwardly within sizing ring 18. As the stroke is completed, dough ball 40 is urged against inner surface 44 and is maintained between surfaces 28 and 32 which shapes tortilla shell 42. The thickness, size and peripheral shape of tortillas shell 42 can be altered by utilizing differently sized and/or shaped sizing rings 18.

Forming machine 10 further includes a vertically extending hinge block 46 that is made from a base plate 48 and two vertically extending plates 49 and 50. Vertically extending plates 49 and 50 are secured to base plate 48 and form an opening 51. Hinge block 46 is secured to top 20 and secured relative to base 14 by the interengagement between fasteners 52, base plate 48 and top 20. Hinge block 46 has a first end 54 adjacent to base 14 and an oppositely facing second end 56. Push member lever 34 is rotatably coupled to hinge block 46 at pivot 58 which is near first end 54. Pivot 58 allows push member 16 to rotate relative to base 14 about a push member axis 60. Hinge block 46 further includes a swing arm 62 is pivotally connected to hinge block 46 at a pivot 64 which is near second end 56. Swing arm 62 is thereby allowed to freely rotate about a swing axis 66. Both lever 34 and arm 62 extend into opening 51 such that their respective pivot points are at least partially within opening 51.

Forming machine 10 further includes a swing lever 70 which is the first link in a linkage mechanism 72 and has a forming end 74 and a linkage end 76. Forming end 74 is pivotally connected to lever 34 at pivot 78 and linkage end 76 is pivotally connected to a rear link 80 at pivot 82. Swing lever 70 is also pivotally connected to swing arm 62 at swing pivot 84 which is between pivots 78 and 80 of ends 74 and 76 respectively.

Lever 70 rotates member 16 about axis 60 as lever 70 is pulled downwardly at pivot 82 by rear link 80 and the remaining links of linkage mechanism 72. In this respect, push member 16 is rotated from an access position (FIG. 2) toward a formed position (FIG. 3) by lever 70. Hereinafter, rotation from the access position to the formed position is a downward stroke while the return to the access position is a return stroke. More particularly, as link 80 forces link end 76 downwardly at pivot 82, lever 70 rotates about swing pivot 86 which in turn pivots counterclockwise about pivot 64. This swinging motion drives end 74 and pivot 78 upwardly and toward first end 54. As a result, push member 16 begins the downward stroke from the access position towards the formed position. Due to the swing motion of lever 70 caused by swing arm 62, a constant input force 90 that is applied to linkage mechanism 72 will not result in a constant stroke rate or stroke force through the downward stroke. In this respect, the swing action of lever 70 will provide a high stroke rate and a low stroke force of push member 16 during the initial portion of the downward stroke and a lower stroke rate and a higher stroke force at the end portion of the downward stroke. This variable mechanical action allows push member 16 to be rotated further away from base 14 when it is in the access position to provide increased accessability and visibility for the operator during the placement of dough ball 40 and the removal of tortilla shell 42. This is accomplished without sacrificing the forming capabilities of the machine or adversely increasing the input force 90 required to complete the forming of shell 42. This variable motion also quickens the forming process by causing push member 16 to move quickly until it engages dough ball 32 and begins the forming process. Furthermore, the variable motion provides for the increased force requirements at the end of the downward stroke as forming surfaces 20 and 30 approach ring 18 and urge the dough against ring surface 44.

Linkage mechanism 72 further includes a plurality of links which join rear link 80 to a pedal 92. Starting at rear link 80 and moving toward pedal 92, mechanism 72 includes a first rocker member 94, a second rocker member 96, and a front link 98. Rockers 94 and 96 are joined by slide mechanism 100. First rocker 94 has a rear end 122 which is pivotally connected to rear link 80 at pivot 102 and on its front end includes a lengthwise slot 104 for slide mechanism 100. First rocker 94 is pivotally connected to a pivot support 106 at pivot 108 which is rigidly secured to cart 22. The pivotal engagement with pivot support 106 allows first rocker 94 to freely pivot or rock about a first pivot support axis 110. Second rocker is pivotally connected to a pivot support 112 at a pivot 114 and pivot support 112 is rigidly secured to cart 22. The pivotal engagement with pivot support 112 allows second rocker 96 to freely pivot or rock about a second pivot support axis 116. Second rocker 96 includes a cam 118 on its back end which slidingly engages slot 104. Second rocker 96 further includes a spring connector 120 used to secure one end of a return spring 122 to linkage mechanism 72. The opposite end of return spring 122 is secured to cart 22 by spring connector 124. Spring 144 is shown as an axially extending helical spring which is one of the many types of springs which could be used in connection with linkage mechanism 72. The action of rockers 94 and 96, and return spring 122 will be discussed in greater detail below.

Front link 98 is pivotally connected to the front end of second rocker 96 at pivot 126. Front link 98 essentially extends vertically and is guided by rollers 128 and 130. Rollers 128 and 130 help maintain the vertical position of front link 98 and also maintain the position of the pedal 92 relative to the cart. Rollers 128 and 130 are maintained by roller mount 131 which is secured to cart 22 by fasteners 133. As will be discussed in greater detail below, pedal 92 moves relative to the cart, however, the rollers control the relative movement therebetween. Front link 98 is pivotally connected to a pedal connector 132 of pedal 92 and further includes a pedal clip 136.

Pedal 92 has a top surface 138 which is large enough and shaped to receive the operators foot, a bottom surface 140, a front edge 142 and a rear edge 144. Pedal connector 132 is secured to top surface 138 near rear edge 144. Pedal 92 further includes a roller 146 secured to bottom surface 140 near front edge 142 by a roller housing 148. Roller 146 rotates about a pedal axis 150 and engages an underlying surface 152 to allow pedal 92 to move horizontally relative to cart 22 as it rotates about axis 150 between a released position shown in FIG. 2 and engaged position shown in FIG. 3. In this respect, as the operator engages pedal 92 it pivots about axis 150, however, axis 150 does not remain stationary. Conversely, as pedal 92 moves from the released position to the engaged position, axis 150 moves away from cart 22 which is facilitated by roller 146. This relative movement allows rear edge 144 to follow the movement of front link 98 which is influenced by the rocking action of second rocker 96. However, rollers 128 and 130 substantially maintain the position of front link 98 and therefore pedal 92 relative to cart 22. The pedal clip 136 on front link 98 allows pedal 16 to be rotated about pedal pivot 134 into a retracted or transportable condition. As stated above, it is advantageous to provide a forming machine which can be easily moved or transported and therefore by providing a pedal which can be quickly retracted and retained so that it does not interfere with the movement of cart 22 helps the transportability of forming machine 10.

Figure 1:
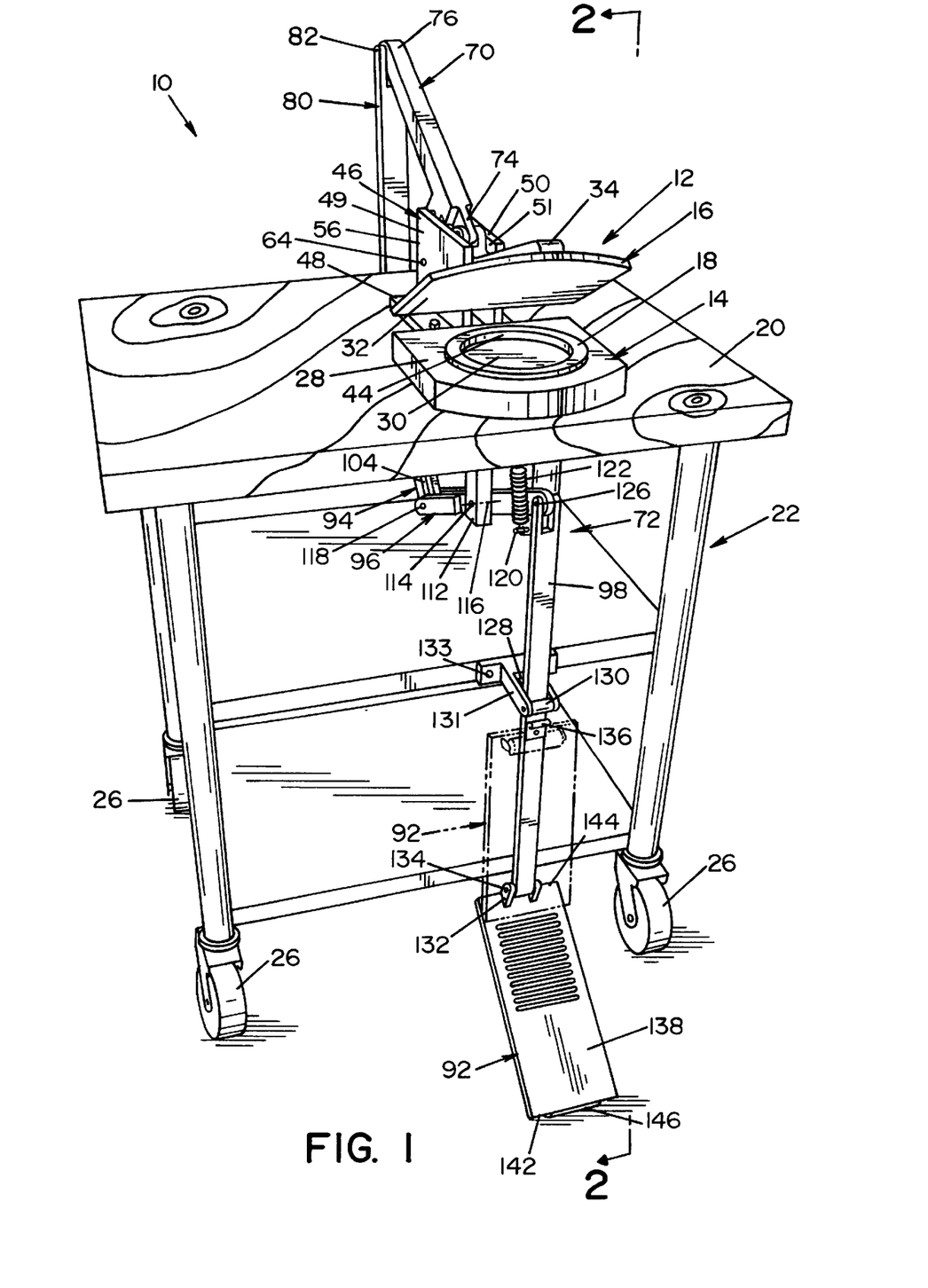
FIG. 1 is a perspective view of a hands free tortilla forming machine in accordance with the present invention which is in the access position.
Figure 2:
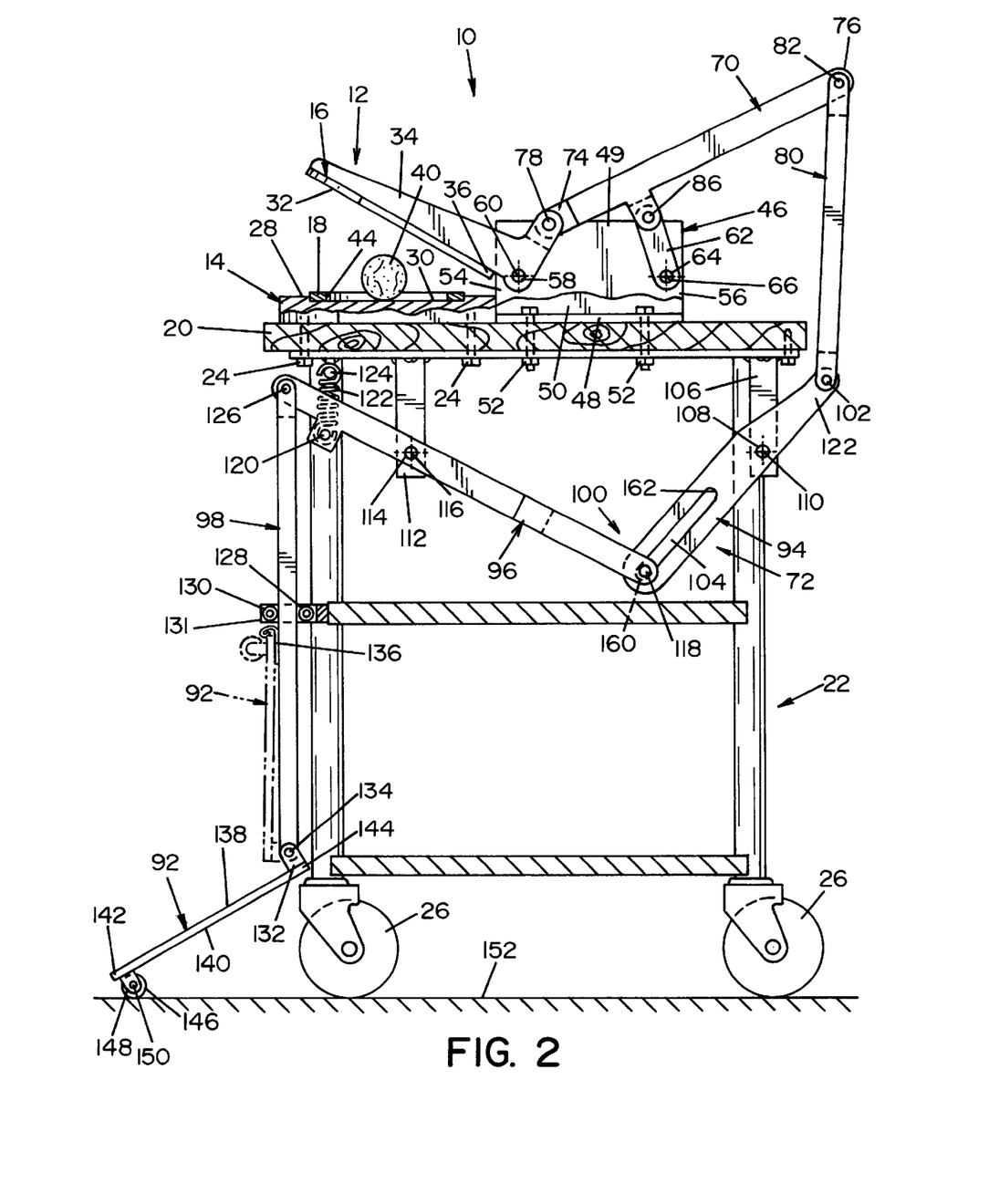
FIG. 2 is a sectional view taken along line 2—2 of FIG. 1.
Figure 3:
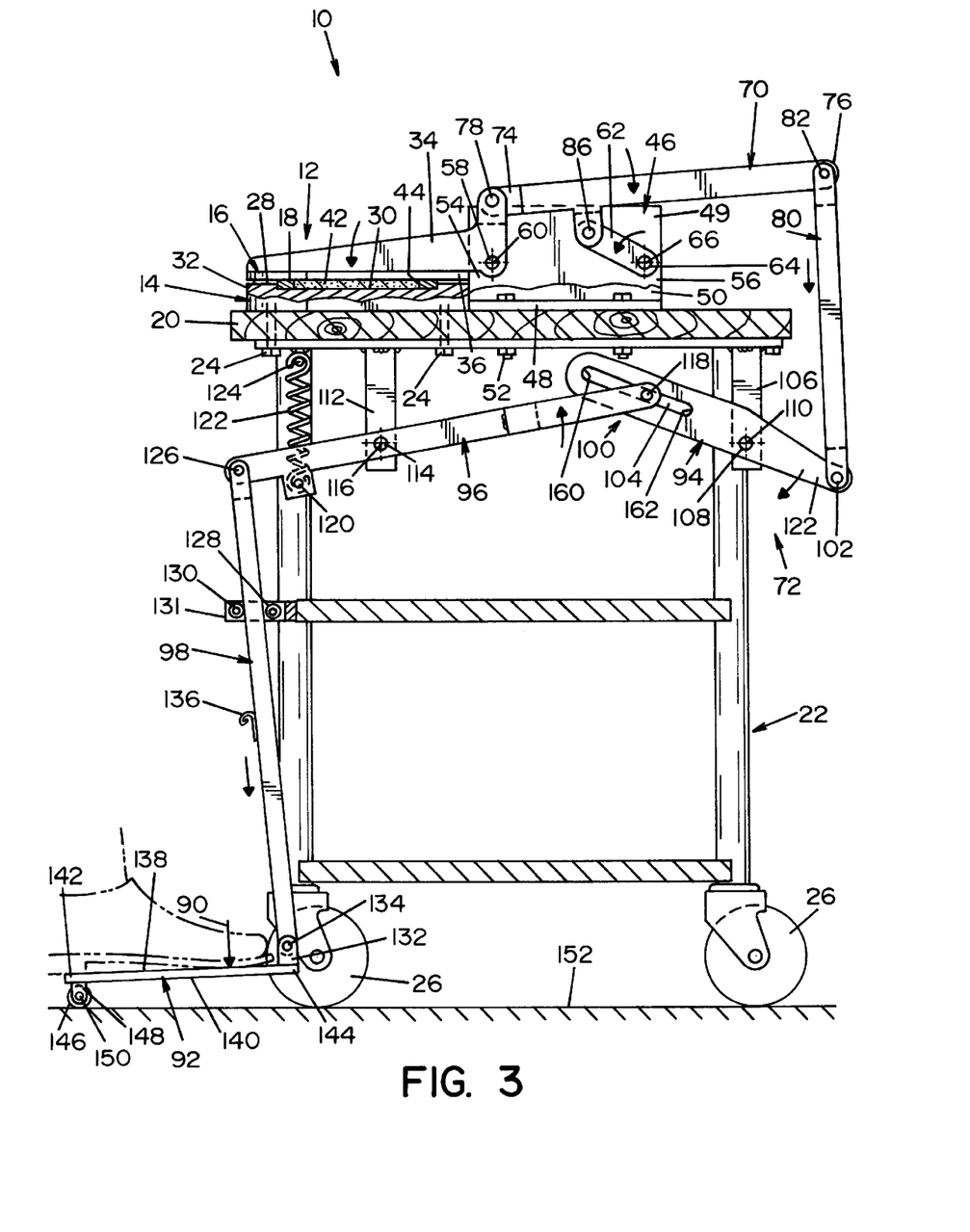
FIG. 3 is a sectional elevational view as shown in FIG. 2 wherein the tortilla forming machine according to the present invention is in the formed position.
Figure 4:
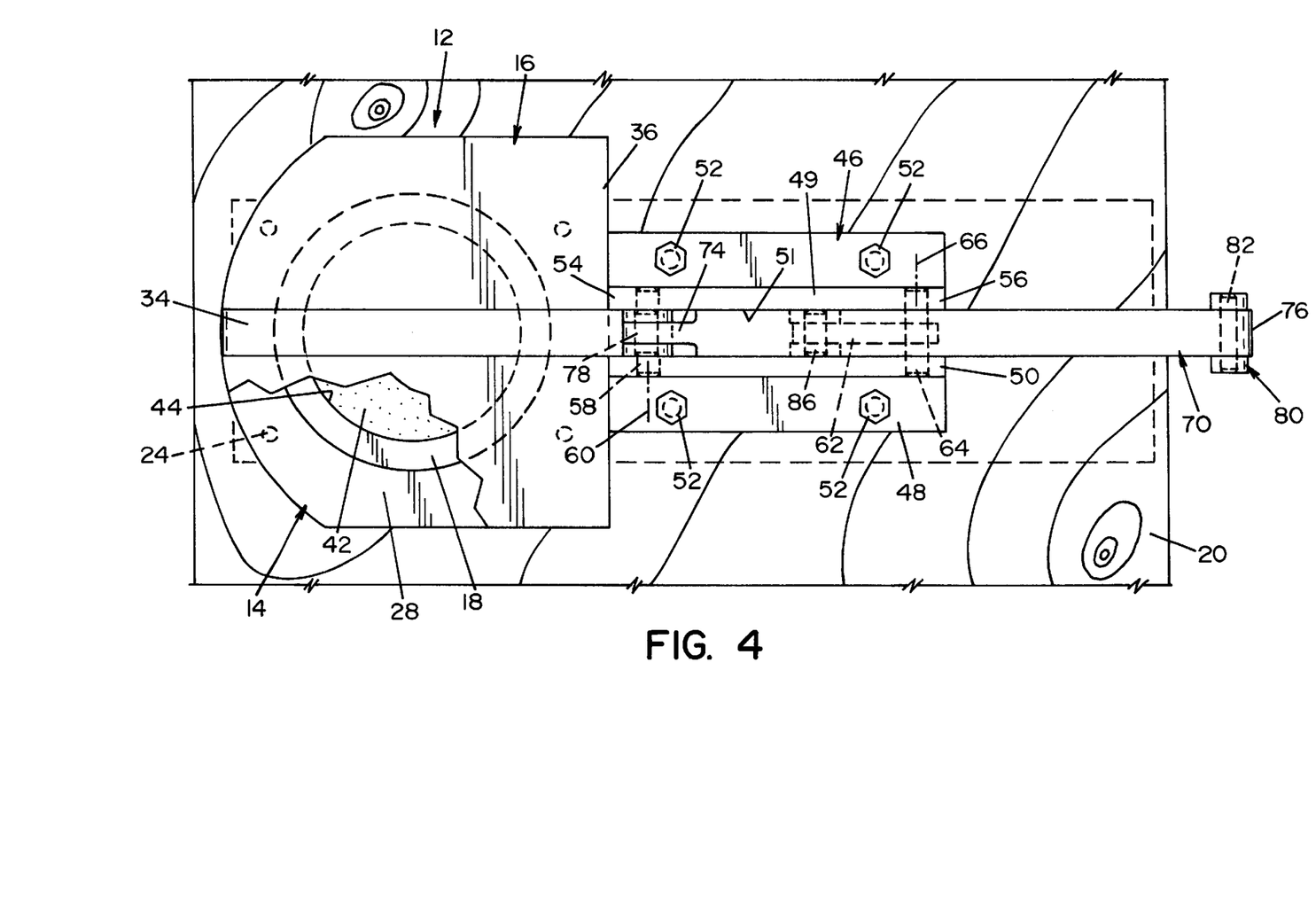
FIG. 4 is a partial section top plan view of the tortilla forming machine as shown in FIG. 3.
Figure 5:
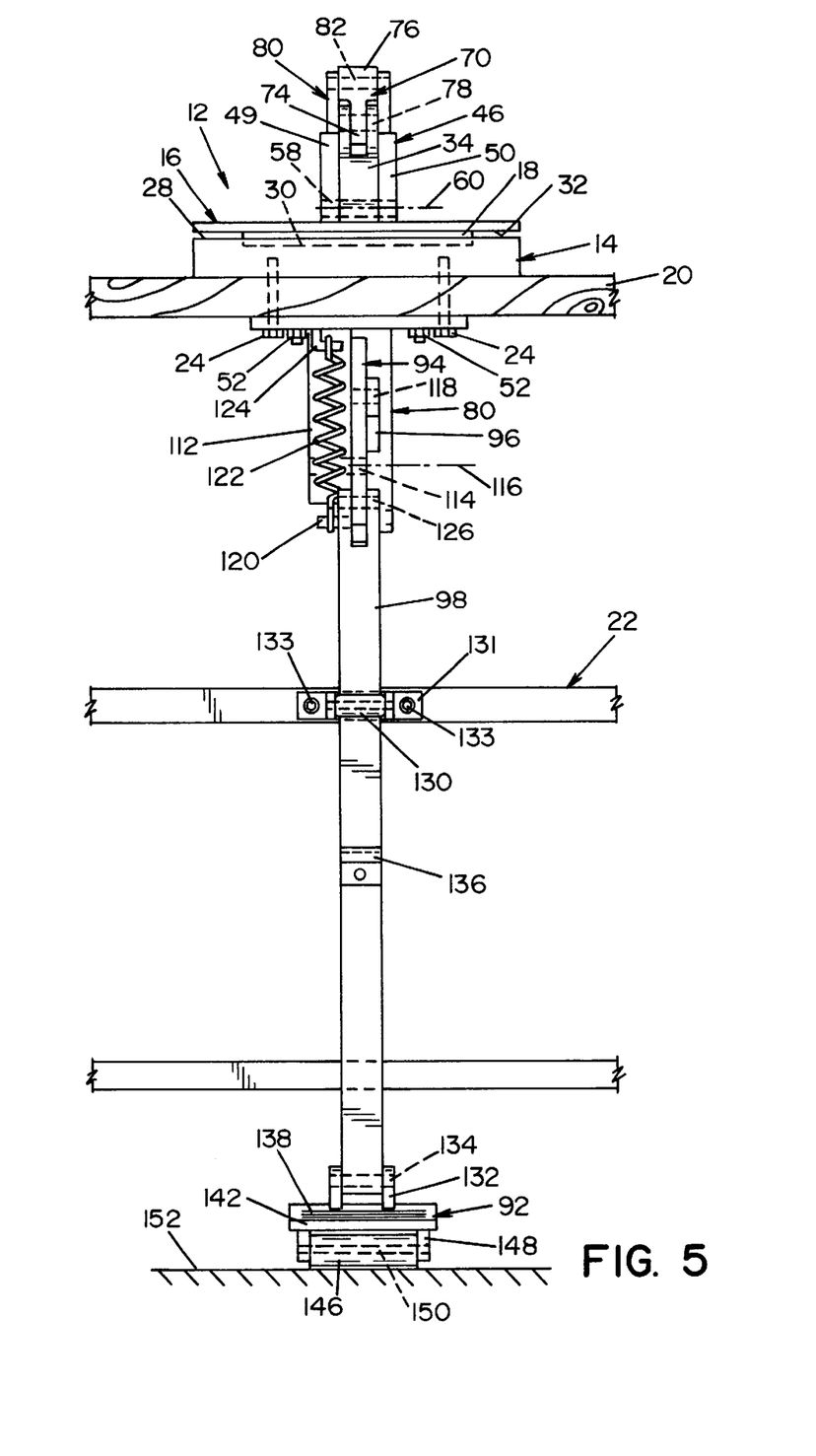
FIG. 5 is partial section front elevation view of the tortilla forming machine as shown in FIG. 3.

Referring to FIGS. 2 and 3, wherein the downward stroke discussed below will be based on the viewing position shown therein, the stroke begins as pedal 92 is forced by the operator's foot from the released position (FIG. 2) toward the engaged position (FIG. 3). In this respect, as pedal 92 begins to rotate about axis 150 and as rear edge 144 move downward, connector 132 urges front link 98 downwardly. The downward movement of link 98 pivots second rocker 96 counterclockwise about pivot axis 116 thereby propelling cam 118 upwardly. As cam 118 moves upwardly, it slides within slot 104 and rotates first rocker 94 clockwise thereby urging pivot 102 downwardly. More particularly, slot 104 has a front end 160 and a rear end 162 and cam 118 begins near front end 160. As second rocker 96 rotates about pivot 116 cam 124 moves upwardly as described above and also moves in slot 104 toward rear end 162. The clockwise rotation of first rocker 94 moves pivot 102 downwardly which in turn urges rear link 80 downwardly. As discussed above, the swinging motion of swing lever 70 results from the downward motion of link 80 and pivot 82. Return spring 122 acts against the counterclockwise rotation of second rocker 96 in order to move linkage mechanism 72 and forming portion 12 back to its initial position.

While considerable emphasis has been placed on the preferred embodiment of the invention illustrated and described herein, it will be appreciated that other embodiments can be made and that many changes can be made in the preferred embodiment without departing from the principals of the invention. Accordingly, it is be distinctly understood that the foregoing descriptive matter is to be interpreted merely as illustrative of the invention and not as a limitation.

Having thus described the invention, it is claimed:

1. A hands free tortilla forming machine for molding dough into a tortilla shell; said forming machine comprising: a base having an upwardly facing forming surface; a vertically extending hinge block mounted relative to said base, said hinge block having a first end facing said base and a second end opposite to said first end; an upper push member having a downwardly facing forming surface, a front end, a rear end and a lever arm protruding from said rear end, said lever arm including a first pivot which is rotatably coupled to said hinge block at a hinge point allowing selective rotation of said push member relative to said base about a member axis between an access position and a forming position, said lever further including a second pivot spaced from said first pivot; a foot pedal which is pivotal about a pedal axis between a released position and an engaged position, said pedal including a connector; a linkage mechanism including a plurality of link arms connected between said pedal connector and said second pivot of said lever arm such that as said pedal is pivoted toward said engaged position said plurality of link arms urge said push member toward said forming position; and a spring which returns said pedal to said released position and said push member to said access position.

2. A hands free tortilla forming machine according to claim 1, wherein said hinge point is a first hinge point, said plurality of link arms includes a swing arm and a swing lever wherein said swing arm is rotatably connected at one end to said hinge block at a second hinge point and at the other end to said swing lever at a swing pivot which is in a central portion of said swing lever, said swing lever being rotatably connected at one end to said second pivot and at the other end to a remainder of said plurality of link arms, said swing lever rotating about said swing point as said push member is urged toward said forming position.

3. A hands free tortilla forming machine according to claim 2, wherein said swing pivot rotates about said second hinge point as said swing lever rotates about said swing pivot.

4. A hands free tortilla forming machine according to claim 2, wherein said swing pivot rotates counterclockwise about said second hinge point as said swing lever rotates about said swing pivot.

5. A hands free tortilla forming machine according to claim 1, wherein said pedal axis moves horizontally as said pedal is pivoted toward said engaged position.

6. A hands free tortilla forming machine according to claim 5, wherein said pedal has a top surface and a bottom surface, said pedal including a roller rotatably connected to said bottom surface which is coaxial to said pedal axis, said roller engaging an underlying surface.

7. A hands free tortilla forming machine according to claim 6, wherein said pedal is rotatable about said pedal connector between an operating position and a retracted position.

8. A hands free tortilla forming machine according to claim 1, wherein said plurality of link arms includes a first and a second rocker member which are pivotal about a first rocker pivot and a second rocker pivot respectively, one of said first and second rockers including a lengthwise slot and the other of said first and second rockers including a cam which slidingly engages said slot such that when said first and second rockers pivot relative to one another, said cam moves in said slot, said first and second rockers pivoting relative to one another as said pedal is pivoted toward said engaged position.

9. A hands free tortilla forming machine according to claim 8, wherein said plurality of link arms further includes a vertically extending front link and a vertically extending rear link, said first and second rockers having inward ends which faces one another and oppositely extending outer ends, said cam and said slot being on one of said inward ends, said first rocker outer end being rotatably coupled to one end of said rear link, said second rocker outer end being rotatably coupled to one end of said front link and the other end of said front link being rotatably coupled to said pedal connector.

10. A hands free tortilla forming machine according to claim 9, wherein said spring is a helical spring attached to one of said first and second rockers.

11. A hands free tortilla forming machine according to claim 1, wherein said pedal axis moves horizontally as said pedal is pivoted toward said engaged position.

12. A hands free tortilla forming machine according to claim 1, wherein said pedal has a top surface and a bottom surface, said pedal including a roller rotatably connected to said bottom surface which is coaxial to said pedal axis, said roller engaging an underlying surface.

13. A hands free tortilla forming machine according to claim 1, wherein said pedal is rotatable about said pedal connector between an operating position and a retracted position.

14. A hands free tortilla forming machine according to claim 2, wherein said plurality of link arms includes a first and a second rocker member which are pivotal about a first rocker pivot and a second rocker pivot respectively, one of said first and second rockers including a lengthwise slot and the other of said first and second rockers including a cam which slidingly engages said slot such that when said first and second rockers pivot relative to one another, said cam moves in said slot, said first and second rockers pivoting relative to one another as said pedal is pivoted toward said engaged position.

15. A hands free tortilla forming machine according to claim 14, wherein said plurality of link arms further includes a vertically extending front link and a vertically extending rear link, said first and second rockers having inward ends which faces one another and oppositely extending outer ends, said cam and said slot being on one of said inward ends, said first rocker outer end being rotatably coupled to one end of said rear link the other end of said rear link being rotatably coupled to said swing lever, said second rocker outer end being rotatably coupled to one end of said front link and the other end of said front link being rotatably coupled to said pedal connector.

16. A hands free tortilla forming machine according to claim 15, wherein said spring is a helical spring attached to one of said first and second members.

17. A hands free tortilla forming machine for molding dough into a tortilla shell, said forming machine comprising: a base having an upwardly facing forming surface; a vertically extending hinge block mounted relative to said base, said hinge block having a first end facing said base and a second end opposite to said first end; an upper push member having a downwardly facing forming surface, a front end, a rear end and a lever arm protruding from said rear end, said lever arm including a first pivot which is rotatably coupled to said hinge block at a first hinge point and allowing selectively rotation of said push member relative to said base about a member axis between an access position and a forming position, a swing arm rotatably connected at one end to said hinge block at a second hinge point and at the other end to a swing lever at a swing pivot which is in a central portion of said swing lever, said lever arm further including a second pivot spaced from said first pivot, said swing lever being one of a plurality of link arms and being rotatably connected at one end to said second pivot and at the other end to a remainder of said plurality of link arms, a foot pedal which is pivotal about a pedal axis between a released position and an engaged position, said pedal including a connector; said remainder of link arms being connected to said pedal connector such that as said pedal is pivoted toward said engaged position said remainder of link arms rotates said swing lever about said swing pivot which in turn rotates said push member toward said forming position.

18. A hands free tortilla forming machine for molding dough into a tortilla shell, said forming machine comprising: a base having an upwardly facing forming surface; a vertically extending hinge block mounted relative to said base, said hinge block having a first end facing said base and a second end opposite to said first end; an upper push member having a downwardly facing forming surface, a front end, a rear end and a lever arm protruding from said rear end, said lever arm including a first pivot which is rotatably coupled to said hinge block at a hinge point allowing selectively relative rotation of said push member relative to said base about a member axis and between an access position and a forming position, said relative rotation from said access position to said forming position being a full downward stroke of said forming machine, said downward stroke having an initial portion and a later portion, said lever arm further including a second pivot spaced from said first pivot; a foot pedal which is pivotal about a pedal axis between a released position and a engaged position, said pedal including a connector; a linkage mechanism including a plurality of link arms connected between said pedal connector and said second pivot of said lever arm, wherein as said pedal is pivoted toward said engaged position at a constant rate, said plurality of link arms urge said push member toward said forming position at an initial stroke rate in said initial portion and a later stroke rate in said later portion, said initial stroke rate being different than said later stroke rate.

19. A hands free tortilla forming machine according to claim 18, wherein said initial stroke rate being is greater than said later stroke rate, such that the rate of rotation of said push member in said initial position is greater than the rate of rotation of said push member in said later position.

20. A hands free tortilla forming machine according to claim 18, wherein said forming machine has a variable stroke rate.

\* \* \* \* \*